(12) United States Patent
Querol Esparch et al.

(10) Patent No.: US 10,981,334 B2
(45) Date of Patent: Apr. 20, 2021

(54) HEATING MECHANISMS FOR BUILD VOLUMES

(71) Applicant: HEWLETT-PACKARD DEVELOPMENT COMPANY, L.P., Houston, TX (US)

(72) Inventors: Carmina Querol Esparch, Sant Cugat del Valles (ES); Alejandro Manuel De Pena, Sant Cugat del Valles (ES); Manuel Freire Garcia, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 389 days.

(21) Appl. No.: 15/745,830

(22) PCT Filed: Sep. 30, 2015

(86) PCT No.: PCT/US2015/053189
§ 371 (c)(1),
(2) Date: Jan. 18, 2018

(87) PCT Pub. No.: WO2017/058197
PCT Pub. Date: Apr. 6, 2017

(65) Prior Publication Data
US 2018/0207876 A1    Jul. 26, 2018

(51) Int. Cl.
*B29C 64/393* (2017.01)
*B29C 64/264* (2017.01)
(Continued)

(52) U.S. Cl.
CPC .......... *B29C 64/393* (2017.08); *B29C 64/264* (2017.08); *B29C 64/295* (2017.08);
(Continued)

(58) Field of Classification Search
CPC ..... B29C 64/393; B29C 64/364; B29C 67/00; B29C 71/02; B29C 64/30; B29C 64/264;
(Continued)

(56) References Cited

U.S. PATENT DOCUMENTS 7,285,237 B2   10/2007   Newell
7,521,652 B2   4/2009    Chung et al.
(Continued)

FOREIGN PATENT DOCUMENTS

CN   204109383   1/2015
CN   204149529   2/2015
(Continued)

OTHER PUBLICATIONS

McDonald, et al; "Prototyping of Microfluidic Devices in Poly(dimethylsiloxane) Using Solid-Object Printing"; 2002; https://gmwgroup.harvard.edu/pubs/pdf/781.pdf.

*Primary Examiner* — Robert J Grun
(74) *Attorney, Agent, or Firm* — HP Inc. Patent Department

(57) ABSTRACT

An example method for cooling a build volume is described. In one implementation, a heating mechanism is set to a temperature identified based on the build material information, and the build volume is heated using the heating mechanism for a time period identified based on the build material information.

20 Claims, 5 Drawing Sheets

(51) Int. Cl.
*B29C 64/295* (2017.01)
*B29C 64/20* (2017.01)
*B33Y 30/00* (2015.01)
*B33Y 40/00* (2020.01)
*B33Y 50/02* (2015.01)
*B29C 67/00* (2017.01)
*B29C 71/02* (2006.01)
*B29C 64/30* (2017.01)
*B29C 64/364* (2017.01)
*B29K 101/12* (2006.01)

(52) U.S. Cl.
CPC ............ *B29C 64/30* (2017.08); *B29C 64/364* (2017.08); *B29C 67/00* (2013.01); *B29C 71/02* (2013.01); *B33Y 30/00* (2014.12); *B33Y 40/00* (2014.12); *B33Y 50/02* (2014.12); *B29K 2101/12* (2013.01); *B29K 2995/004* (2013.01)

(58) Field of Classification Search
CPC ....... B29C 64/295; B33Y 30/00; B33Y 50/02; B33Y 40/00; B29K 2101/12; B29K 2995/004
See application file for complete search history.

(56) References Cited

U.S. PATENT DOCUMENTS

| | | | |
|---|---|---|---|
| 8,137,609 | B2 | 3/2012 | McAlea et al. |
| 2010/0292823 | A1 | 11/2010 | Biester |
| 2012/0119399 | A1 | 5/2012 | Fruth |
| 2015/0252190 | A1 | 9/2015 | Rodgers |
| 2016/0332384 | A1* | 11/2016 | De Pena ................ B33Y 30/00 |

FOREIGN PATENT DOCUMENTS

| | | |
|---|---|---|
| CN | 104626592 | 5/2015 |
| CN | 104785780 | 7/2015 |
| DE | 102005052440 | 5/2007 |
| EP | 1674243 | 6/2006 |
| EP | 1707341 | 10/2006 |
| WO | WO-2011045291 | 4/2011 |
| WO | WO-2014086943 | 6/2014 |
| WO | WO-2014184117 | 11/2014 |
| WO | WO-2015108560 | 7/2015 |

* cited by examiner

HEATING MECHANISMS FOR BUILD VOLUMES

BACKGROUND 3D printing is a form of solid freeform fabrication that may enable the generation of 3D objects including final products, prototype parts, and working tools. There are many forms of 3D printing techniques and various printable materials usable in 3D printing. 3D printing techniques may utilize an additive process in which an object (described by electronic data) is built layer by layer from build material(s). For example, an object model of an object may have voxel information and be sliced into layers to allow a print device to form a cross section slice of the object using build material as a first layer and build a second layer on top of the first layer, and continuing until the final object is produced.

DETAILED DESCRIPTION

Figure 1:
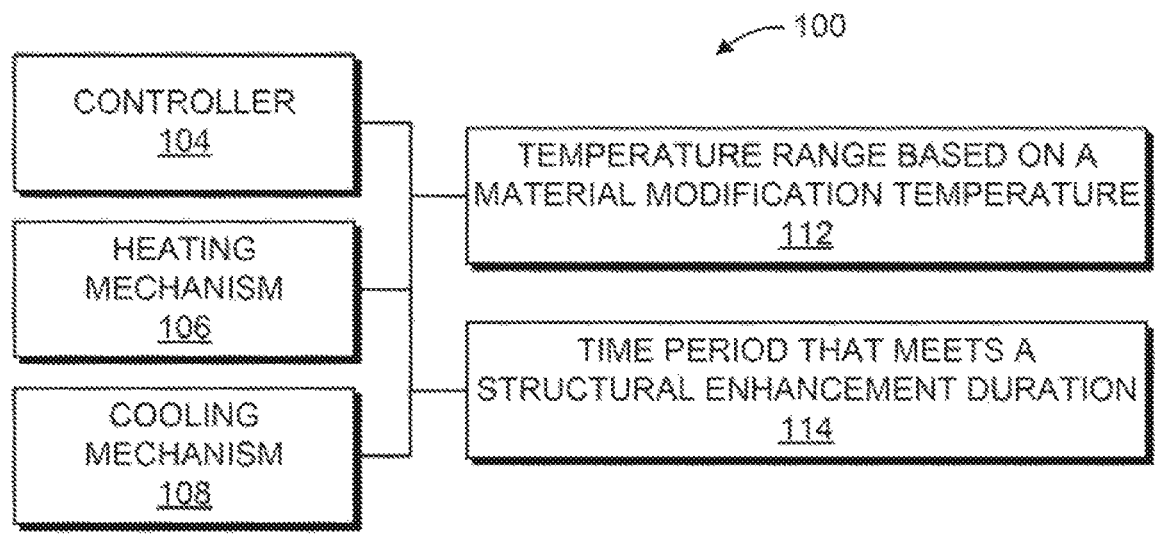
FIG. 1 is a block diagram depicting an example post-print system.

The terms "include," "have," and variations thereof, as used herein, mean the same as the term "comprise" or appropriate variation thereof. Furthermore, the term "based on," as used herein, means "based at least in part on." Thus, a feature that is described as based on some stimulus may be based only on the stimulus or a combination of stimuli including the stimulus.

In the following description and figures, some example implementations of apparatus, systems, and/or methods for cooling a build volume are described. Example apparatus described herein include print devices and post-print devices. In examples described herein, a "print device" may be a device to print content on a physical medium (e.g., paper or a layer of powder-based material, etc.) with a printing fluid (e.g., ink or toner). In the case of printing on a layer of powder-based material, the print device may utilize the deposition of printing fluids in a layer-wise additive manufacturing process. A print device may utilize suitable printing consumables, such as ink, toner, fluids or powders, or other raw materials for printing. An example of printing fluid is ink ejectable from a printhead. In some examples, a print device is a three-dimensional (3D) printing device that prints 3D objects and performs post-print operations as described herein.

In the 3D printing context, build material (e.g., what the printed objects are made of) is used to compose 3D objects. In some examples a build material may comprise a base material (e.g., powder), a printing fluid (e.g., ink), or a combination of base material and printing fluid. For example, the build material may comprise plastic, metal, ceramic, wax, resin, concrete, nanotubes, paper, food, or even biological material, as examples. The material may be provided in a form to allow for printable fluid to be acted upon by the printing device to create an object. A build volume is generated as a result of laying down layers of build material and solidifying portions of the layer. For example, the build material may be powder that is used by a print device to generate a build volume comprising solidified and unsolidified build material by selectively applying energy thereto (e.g., sintering), thus resulting in a build volume that may comprise the 3D object, such as an object made of solidified build material (e.g., fused powder), and/or material not used to create the 3D object (e.g., unsolidified build material, such as unfused powder or supports). As used herein, a printing stage represents a phase of operations used to print a build volume and a post-print stage represents a phase of operations performed after a build volume is generated, such as unpacking the build volume (e.g., separating the solidified build material and the unsolidified build material), cleaning the fused powder, and remixing the unfused powder.

A "post-print system" as used herein represents a system that performs operations after printing (discussed herein as post-print operations during the post-print stage), such as operations performed after a 3D object has been generated. In examples described herein, a post-print system may comprise a post-print device that performs the post-print operations. In some examples, the post-print operations discussed herein are performed in a post-print device, such as an unpacking, cleaning, and recycling (UCR) device. An example UCR device may complete post-print processes during a post-print stage, for example, an unpacking and/or cleaning process that removes unfused powder from a build volume comprising unfused powder and a 3D object of fused powder, such as by blowing air towards the build volume or vacuuming air away from the build volume. In some examples, the post-print system may comprise the print device that performs both the print operations and the post-print operations.

After a printing process completes, the build volume may be hot, such as near fusing temperature, and is allowed, for example, to cool at a slow enough rate to prevent object distortion. For example, a build volume may be left in a printer device to cool down as slow as possible and allow heat to dissipate from the build volume unaided. The end-to-end turn-around time for printing a usable 3D object may depend as much on the printing time as on the post-processing time. For example, the time period of a cool down process may even exceed the time used for printing when the build volume is merely left to cool by itself (i.e., independent of any mechanisms to assist cooling). For example, the build volume may need to cool for 9 hours when it takes 6 hours to generate a build volume. For another example, a build volume that is generated in 4 hours may use 6 hours to cool before being handled. In this manner, the cool down process of a build volume may have an impact on the productivity of the system. Accordingly, being able to speed up the cool down time would enable the turn-around time to be reduced significantly. However, in current systems, rapid cooling may cause undesirable part distortions or otherwise affecting the mechanical properties of a part as a result of, for example, uncontrolled shrinkage through high thermal gradients and the rate at which the material is allowed to cool down.

Various examples described below enable the cool down time of a build volume to be reduced without introducing, or introducing only in acceptable amount, undesirable part distortion. Various examples provide, for example, maintaining heat applied to a build volume for a first period of time, and then rapidly cooling the build volume after the end of the first period.

For example, maintaining heat of a build volume within a temperature range based on a material modification temperature after the build volume is printed, may, for example, allow the build material to establish a change in a structural property, a mechanical property, and/or a chemical property of the build volume. For example, a structural property may be a structural consistency level of a build material that represents an amount of rigidity of the structure of a build volume built from that build material. For example using a semi-crystalline thermoplastic as a build material, a build process may involve heating the semi-crystalline thermoplastic material from a printing temperature (i.e., a temperature of the build material maintained prior to performing a print process) to above the melting temperature to allow fusing to occur and a post-build process may involve heating the semi-crystalline thermoplastic material to above a crystallization temperature to allow crystals of the material to grow and cooling the build volume down to room temperature to allow the object to harden and be handled. As a result of heating after the build volume is completed, the build material may have, for example, improved material characteristics compared to build material that is printed without post-print stage heating within a temperature range based on the material modification point of the build material. For example, the structural integrity of a build volume after being heated for a time period during the post-print stage may resist warping or other undesirable effects on the build volume when performing active cooling techniques. In that example, the structural integrity may allow for cooling techniques to be applied to the build volume that may cool the build volume at a faster rate than the ambient environment would allow and, thus, for example, may reduce wait time with a decreased chance of distortion.

FIGS. 1 and 2 are block diagrams depicting example post-print systems 100 and 200. Referring to FIG. 1, the example post-print system 100 of FIG. 1 generally includes a controller 104, a heating mechanism 106, and a cooling mechanism 108. In general, the heating mechanism 106 may heat a build volume when present in the housing for a time period after printing and before cooling the build volume when present in the housing using the cooling mechanism 108.

As used herein, a housing may be any appropriate structure that defines a space where a build volume may be placed (e.g., where a build volume is printed or where the build volume is unpacked and cleaned). An example housing may be a cuboid enclosure, such as a rectangular bucket having four side walls made of metal and a lid. The space defined by the housing is referred to herein as a post-print environment because the bounded space is where operations of a post-print stage are performed. For example, the post-print environment may be an enclosed space within a housing where a build volume is located and the heating mechanism 106 and/or the cooling mechanism 108 is able to access the space bounded by the housing (e.g., the interior space of the housing) to modify the post-print environment (e.g., heat up or cool down the build volume in the interior space). As discussed further herein, the housing may, for example, be heated and cooled at temperatures that provide a desired effect on the object(s) defined by the solidified build material of the build volume when within the housing.

As used herein, a "controller" represents circuitry or a combination of circuitry and executable instructions to perform a particular function based upon execution of the instructions. The controller 104 is a combination of circuitry and executable instructions that controls the heating mechanism 106 and the cooling mechanism 108 based on build material information associated with a build volume. As discussed further herein, the build material information represents a build material used in the generation of a build volume via the printing process. The build material information is obtained by the controller 104 to determine settings of the heating mechanism 106 and cooling mechanism 108. The settings managed by the controller 104 are parameters of operation and include a temperature and a time period, such as temperature 112 and time period 114. The settings may be determined by identifying build material information and associating the build material information with settings of the mechanisms 106 and 108. For example, the controller may determine settings by retrieving preset build information from a local memory resource, parsing the build material information from print job information, and/or obtaining the build material information as input from a user of the system 100, and using the retrieved information directly (when the build material information includes the data useable as settings) or indirectly by using the build material information to retrieve further data, such as data from a lookup table, a thermal model, or a temperature profile. In general, the controller 104 causes the heating mechanism 106 and the cooling mechanism 108 to operate as described herein.

As used herein, a "mechanism" represents a temperature-affecting device or a combination of a temperature-affecting device, circuitry, and executable instructions that, when executed by the circuitry, operate the temperature-affecting device. The heating mechanism 106 represents a temperature-affecting device or a combination of a temperature-affecting device, circuitry, and executable instructions to heat a build volume when present in a housing within a temperature range for a time period during a post-print stage. For example, the heating mechanism 106 may be temperature-affecting device to heat an interior space of the housing within a temperature range sufficient to chemically modify the solidified build material and for a time period sufficient for enhancement of the structure of the build volume.

In one example, the build volume may be transferred to a post-print device after a print job completes and the heating mechanism 106 of the post-print device may maintain the post-print environment within the housing by producing heat at a temperature for a time period 114 that satisfies a structural enhancement duration. As used herein, a structural enhancement duration represents a time period used to change the build material to change a strength of the solidified build volume, such as a minimum time period to achieve a structural consistency level of the solidified build material. For example, the structural enhancement duration of a plastic build material may depend on the re-crystallization time of a given polymer at a set temperature. Furthermore, as used herein, a structural consistency level represents a degree of a structural property of a build material, such as tensile strength, the size of crystallites, a height of a column of crystallites, or space of connected by crystallites. The structural consistency level may, for example, be identified by the attributes or organization of molecules of the build volume, based on measurements of build volume, or based on the amount of force withstood by a build material without distorting the build volume.

The heating mechanism 106 produces heat within a temperature range 112 based on a material modification temperature of the build material. As used herein, a material modification temperature is a temperature property of the build material where the chemical structure of the material is modified at that temperature without changing phase (i.e., material modifications that occur while in a phase and disregarding material modifications due to a change in phase). The temperature range may be, for example, at, around, or above a material modification temperature of a build material. For example, the temperature range may include temperatures around a crystallization point of a build material (i.e., a point in temperature where the build material experiences crystallite growth) or thermal processing temperatures for particular types of thermal processing. For another example where the crystallization point of a build material is a material modification temperature, the heating mechanism 106 may maintain a temperature range above the crystallization point of the build material and below the melting point of the build material such that the temperature of the build volume is uniformly at or above the crystallization point. For another example, the crystallization point may represent a minimum post-print heating temperature and the heating mechanism 106 produces heat above the crystallization point for the structural enhancement duration. The build material may be affected by heat above the crystallization point, by, for example, forming larger crystals based on the energy transferred into the material via heating the material. By maintaining the temperature above the crystallization point, the build material may, for example, become thermally modified to enhance the formation of bigger crystallites.

The heating mechanism 106 may maintain a temperature below the fusing point of the build material as to restrain unsolidified build material (e.g. unfused powder) from fusing to the 3D object within the build volume during the post-print stage. This may allow for the solidified build material to, for example, enhance the structural consistency of the object built of the build material without fusing additional powder after the print job completes and avoid deformation of the 3D object.

The heating mechanism 106 may heat a subset of build layers of a build within the housing or the heating mechanism 106 may heat the post-print environment within the housing uniformly. For example, in a print device with a post-print system, such as post-print system 100, the post-print system may track the print layers at the time they are printed and focus the heat from the heating device on the layers that have not been heated long enough to satisfy the threshold time period (e.g., the structural enhancement duration). For another example in a post-print device, the post-print system 100 may include a heat lamp focused at the top section of a bucket (e.g., a box-like structure enclosing the build volume) where the most recently printed layers of material would be located.

The heating mechanism 106 may comprise an active heating device, such as a heat lamp, that actively provides heat within housing (e.g., actively generates heat energy within the post-print environment) and/or a passive heating device, such as an insulated blanket, that passively maintains the heat of the build volume within a housing (e.g., inhibits heat energy from leaving the housing). In an example, the heating mechanism 106 may include a heating device that comprises at least one of a heat lamp or a resistor-based heat element, such as a heat blanket. In another example, a print device may print the build volume at or above a fusing point temperature and the heating mechanism 106 may comprise an insulator to maintain the temperature of the build volume after being printed. In that example, the post-print environment may be insulated by covering an interior surface of the housing with an insulator material or inserting insulator material inside the wall structure of the housing, and the temperature of the build material may be maintained within the range of the fusing point and the crystallization point for at least the structural enhancement duration due to the insulator material.

Figure 3A:
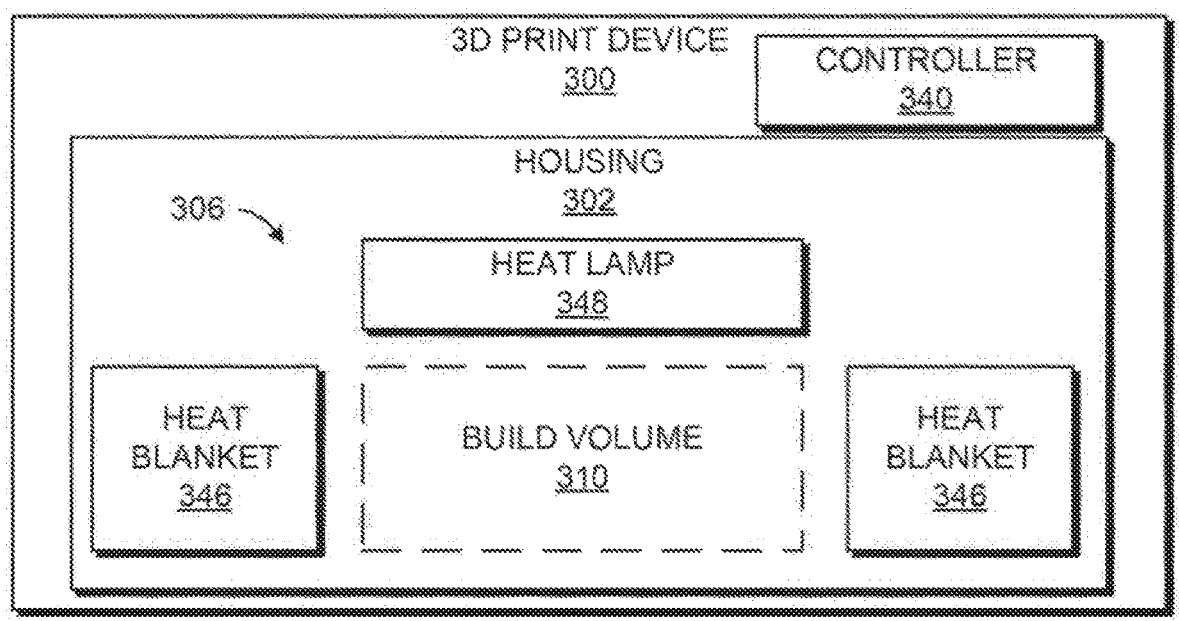
Figure 3B:
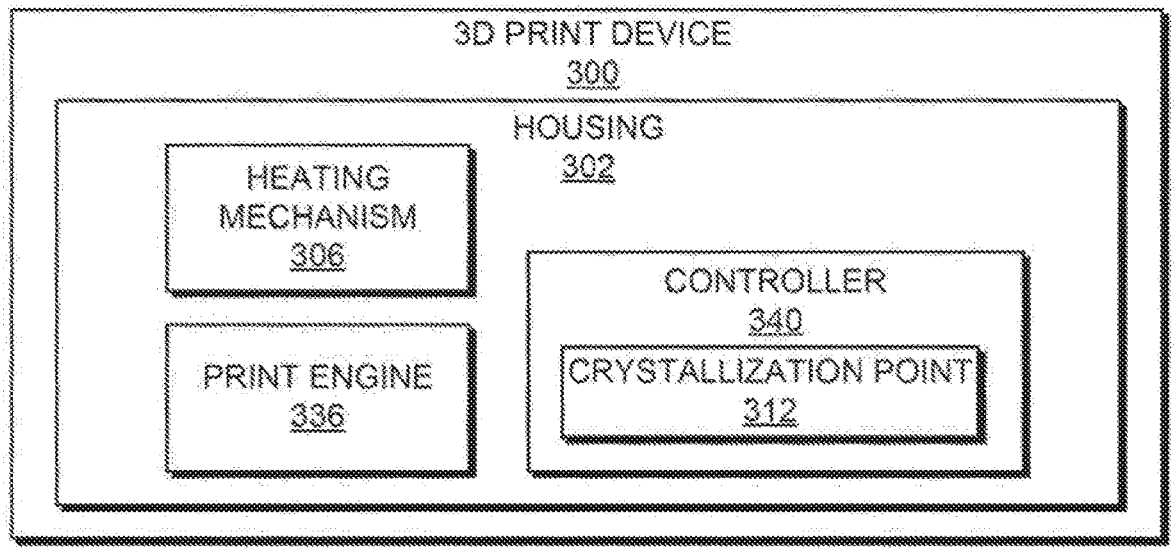
FIGS. 3B and 3C are block diagrams depicting example print devices.
Figure 3C:
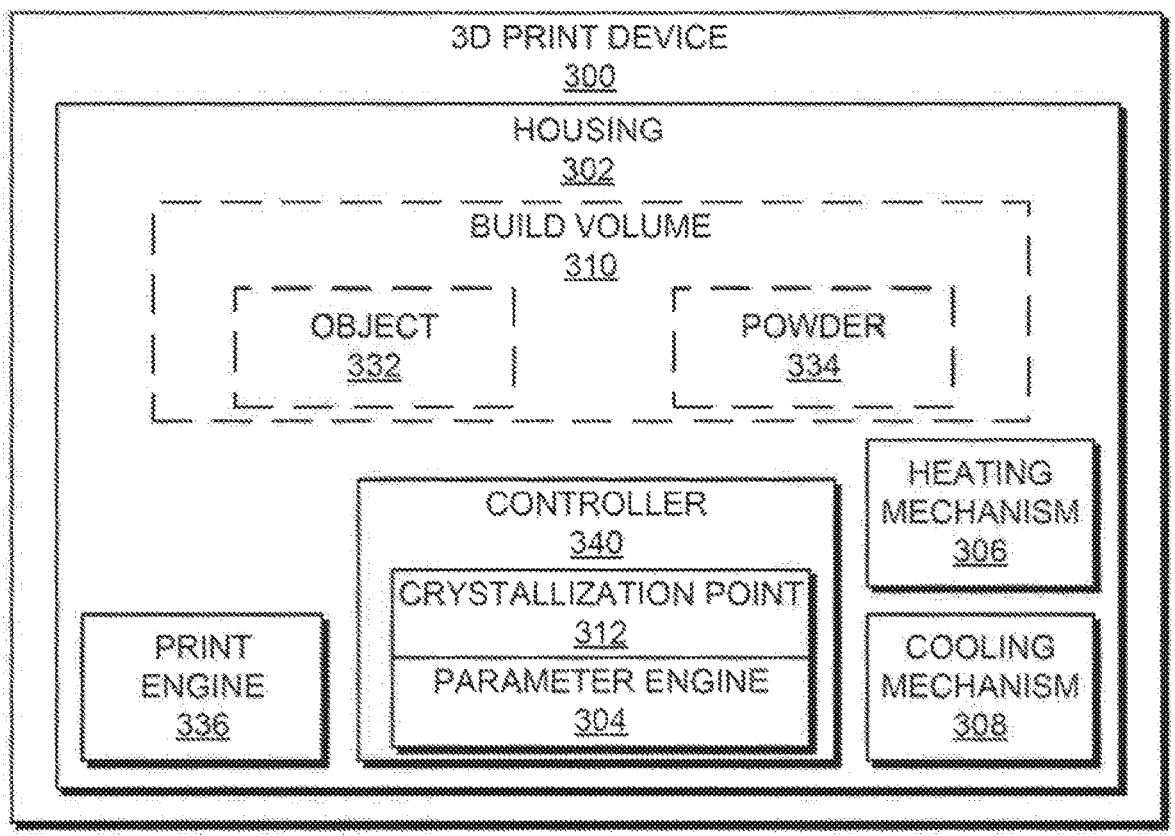

The controller 104 may comprise a parameter engine, such as parameter engine 304 depicted in FIG. 3C, to allow the system 100 to adapt to different build materials used to complete various print jobs. As used herein, an "engine" represents circuitry or a combination of circuitry and executable instructions that, when executed, cause the circuitry to perform a function. The parameter engine represents any circuitry or combination of circuitry and executable instructions to identify build material information that represents a build material of a printed output produced by executing a print job. For example, the parameter engine may identify the build material information by retrieving build material information within print job information that represents a class of build material to be used to process the print job. The print job is described by print job information, such as data representing values of properties of the print job that, when completed by a print device, produces a 3D object as printed output. For example, the print job information may contain a build material identifier that is a value or label representative of a build material, such as a value representing a class of build material. Classes of build material include plastics, ceramics, glass, metals, etc. as well as versions of the types of materials. For example, a first plastic made of a first polymer and a second plastic made of different, second polymer may be associated with separate build material identifiers. The build material information may be obtained (e.g., identified) in a variety of ways. For example, the build material information may be predetermined and stored on a local memory resource of the system 100. For another example, the build material information may be identified by the post-print system via a cartridge of material coupled to the post-print system.

As used herein, a print job represents a request to execute operations on a print device to create printed output furthermore, print job information, as used herein, represents a data representation of the print job, such as an electronic file containing data representing voxel information of a 3D model that is used by a print device to create printed output. The print job information may be contained in a data structure stored on a computer-readable medium. For example, the print job information may be contained in a data structure, such as a job ticket data structure, that represents the print job by providing variables that store values associated with the print job, such as build material information. A computer-readable medium containing the print job information may be integrated and/or separate from the post-print device or print device. For example, the parameter engine may retrieve the build material information from at least one of a connected compute device, a storage location in a cloud compute environment, and/or a computer-readable medium coupled to a transport device used to transport printed output. As used herein, a transport device includes a movable cart or other device that is able to support, contain, or otherwise hold and transport a build volume produced from a 3D print device. The transport device may also include a housing, such as a bucket to hold a printed build volume.

Build material information is used to identify a temperature and a time period associated with the post-print process described herein. For example, the parameter engine may determine a temperature and a time period used by the heat mechanism 106 by looking up a build material identifier in a lookup table and retrieving the temperature and time period associated with the build material identifier. For example, the parameter engine may retrieve "PLA02" as a build material identifier from print job information, use "PLA02" as an alphanumeric key to identify field values in a lookup table, and retrieve a temperature and time period associated with the "PLA02" key. The temperature identified may be a range of temperatures or a specific temperature within a range. For example, the temperature identified may be at or above the material modification temperature of the build material (e.g., the crystallization point) associated with the identifier to ensure that heating a build volume at the temperature capable of producing a physical effect on the structural integrity of the solidified build material. For another example, the parameter engine may identify the temperature and a time period from a thermal model, such as a function that represents a relationship between a temperature and time period using the build material or a simulation based on test results or entropy readings from a differential scanning calorimeter where the entropy readings are at or above an entropy threshold. For yet another example, the build material type/identifier could be entered by a user into a post-print device or identified from a material cartridge coupled to a print device. The build material information used to identify the temperature and time period may represent a build material usable by the 3D print device.

The temperature and the time period associated with the build material information are used as settings to operate the heating mechanism 106. For example, the heating mechanism 106 may provide heat at the temperature and time period identified from the build material information (e.g., using a lookup table or dynamic calculations using a model defined by a function). The time period identified represents a threshold minimum time to heat the build volume at a given temperature, such as a time period equal to or greater than the structural enhancement duration. For example, the heat lamp of FIG. 3A may stay on and emit heat for a time period 114 of FIG. 1 (identified by the parameter engine) after the last layer of the build volume is printed. The time period identified may have an inverse relationship with the temperature associated with the time period. For example, a first temperature slightly higher than the crystallization point of the build material may result in a first time period and a second temperature higher than the first temperature may result in a second time period shorter than the first time period. The temperature range and time period may be selected to attune crystallinity or other chemical properties in order to stabilize, give fracture toughness, or otherwise structurally improve to the build volume.

Temperature ranges useable by the heat mechanism 106 are based on thermal properties of the build material. For example, plastics may be heated for fusing purposes from between about 80 degrees Celsius to about 325 degrees Celsius depending on the type of plastic. In general, the crystallization point for many plastics within 40 degrees from the melting point. For example, a plastic that melts at about 325 degrees Celsius would be heated within a range of about 285 degrees Celsius and about 324 degrees Celsius in accordance with the description herein. For another example, if the melt temperature of a plastic is about 180 degrees Celsius and the crystallization temperature is about 140 degrees Celsius, then the heating mechanism 106 may heat a build volume within the housing between about 140 degrees Celsius and below 180 degrees Celsius during a post-print stage. For yet another example, if the melt temperature of a plastic is about 165 degrees Celsius and the crystallization temperature is about 140 degrees Celsius, then the heating mechanism 106 may heat a build volume within the housing between about 140 degrees Celsius and below 165 degrees Celsius during a post-print stage. For yet another example, if the melt temperature is about 185 degrees Celsius and the crystallization temperature is about 145 degree Celsius, then the heating mechanism may heat a build volume within the housing between about 145 degrees Celsius and about 180 degrees Celsius. Post-print heating at a temperature closer to the melt temperature may reduce the structural enhancement duration in comparison to post-print heating performed at a lower temperature in a range that is closer to the crystallization temperature. Temperature ranges used by the heating mechanism 106 may vary in size based on the build material. Example post-print heating ranges for various plastics to be used by the heat mechanism 106 include about a 40 degree range from the melting point of the material, about a 30 degree range from the melting point, about a 20 degree range from the melting point, about a 15 degree range from the melting point, and about a 10 degree range from the melting point. Example post-print heating ranges for other materials, such as various ceramics, to be used by the heat mechanism 106 include a range size of about 10 degrees, a range size of about 20 degrees, a range size of about 25 degrees, a range size of about 30 degrees, a range size of about 40 degrees, a range size of about 50 degrees, a range size of about 75 degrees, a range size of about 100 degrees, a range size of about 125 degrees, a range size of about 150 degrees, and a range size of about 200 degrees.

The heating mechanism 106 may adapt to ranges specific to particular materials. For example, metals have a wide variety of thermal processing temperatures, especially for alloys. Example melting points for metals (including some alloys) include about 100 degrees Celsius, about 200 degrees Celsius, about 230 degrees Celsius, about 400 degrees Celsius, about 650 degrees Celsius, about 1000 degrees Celsius, about 1670 degrees Celsius, and about 2425 degrees Celsius. For metals, the thermal processing stage may utilize temperatures about half of the melting point temperature in Kelvin degrees. For example, the material modification temperatures for metals may include about 185 degrees Kelvin, about 235 degrees Kelvin, about 250 degrees Kelvin, about 335 degrees Kelvin, about 460 degrees Kelvin, about 635 degrees Kelvin, about 970 degrees Kelvin, and about 1350 degrees Kelvin.

Glass materials and ceramic materials may be composite materials where a crystal phase may be grown in a glass matrix to improve mechanical and thermal properties. An example material modification temperature for glass may be about 600 degrees Celsius and an example temperature range for thermally processing (e.g., heating) the glass during a post-print stage may be about 550 degrees Celsius to about 650 degrees Celsius. For another example, a glass material may melt at about 720 degrees Celsius, may be sintered at temperatures between about 650 degrees Celsius and 700 degrees Celsius, may have a material modification temperature of about 550 degrees Celsius, and may be maintained at a temperature range of about 520 degrees Celsius to about 600 degrees Celsius. A material may have multiple material modification temperatures, such as an oxide glass that has shown peak crystallization temperatures at about 600 degrees Celsius and at about 950 degrees Celsius. In that example, the temperature range may include both material modification temperatures by creating a large range of post-print heating temperatures (e.g., about 550 degrees Celsius to about 1000 degrees Celsius) or the selected temperature range may include multiple sub ranges (e.g., the post-print heating temperature range includes a first range from about 550 degrees Celsius to about 625 degrees Celsius and a second range from about 925 degrees Celsius to about 1000 degrees Celsius).

An example material modification temperature for a ceramic material may be a crystallization point of about 894 degrees Celsius and an example temperature range to thermally process the ceramic material during a post-print stage may be about 895 degrees Celsius to about 1050 degrees Celsius. For another example, an example crystallization point temperature for a ceramic material may be 982 degrees Celsius and an example range to thermally process the ceramic material may be about 1030 degrees Celsius to about 1100 degrees Celsius. For yet another example, a crystallization point for a ceramic material may be about 1098 degrees Celsius and the post-print thermal processing range may be about 1011 degrees to about 1200 degrees Celsius.

Amorphous metal materials (e.g. bulk metallic glasses) may exhibit similar thermal behaviors as oxide or related non-metal glasses. For example, an amorphous metal may have a material modification temperature of about 788 degrees Kelvin and the temperature range to heat the amorphous metal material during a post-print stage may be from about 780 degrees Kelvin to about 805 degrees Kelvin.

The time periods at which the build volume is heated (and/or the interior space of the housing is heated) may be based on the structural enhancement duration, as discussed herein. For example, the minimum amount of time to have an effect on the structural integrity of the build volume may depend on a particular build material and a particular temperature within the temperature range. Example time periods based on the structural enhancement duration include about 180 minutes, about 120 minutes, about 90 minutes, about 60 minutes, about 40 minutes, about 30 minutes, about 20 minutes, and about 15 minutes.

Fusing agents may accelerate crystallization and the settings for the heating mechanism 106 may be adjusted accordingly. For example, the time period for post-print heating may be reduced when a fusing agent is added. For another example, a build material with a melt temperature of about 186 degrees Celsius and a fusing agent with a melt temperature of about 178 degrees Celsius may combine to crystallization temperature of about 152 degrees Celsius and the heating mechanism may heat between about 152 degrees Celsius and about 178 degrees Celsius. For yet another example, the build material information may include a temperature profile with sets of temperatures and time periods in various combinations of build materials useable by a print device. In one example implementation, the parameter engine may adapt to build material information that indicates a plurality of build materials used during the print process. For example, the lookup table used by the parameter engine may include lookups performable using multiple build materials to identify an appropriate material modification temperature and structural enhancement duration. For another example, the parameter engine may use a thermal model calculation that utilizes multiple input parameters that describe the types of build materials used, such as multiple powders and/or multiple fusing agents, and calculates a resulting temperature range and time period accordingly, such as by reducing the time period associated with a build material and temperature when a fusing agent is added to the build material.

After the build volume remains heated for the time period, the build volume may be unpacked, cleaned, and cooled. For example, after the structural enhancement duration and parts in the housing have achieved a certain structural consistency having transitioned from the viscous molten state to the solid phase, the surrounding powder cake may be broken (if needed) by the introduction of compressed air at ambient temperature external to the housing and powder may be removed, for example, by a vacuum. The heating mechanism 106 and the cooling mechanism 108 may be used by a post-print device that performs the unpacking, cleaning, and cooling processes. The unpacking, cleaning, and cooling processes may be performed serially or concurrently. For example, the heat mechanism 106 may be part of a UCR device and after the post-print heating process, an unpacking and cleaning process may be performed where the unfused powder is removed from the build volume in preparation for a cooling stage managed by the cooling mechanism 108. For another example, the unpacking, cleaning, and cooling processes may be performed in parallel by circulating compressed cool air within the housing until the unfused powder is sufficiently removed and until the 3D object of the build volume achieves a resting temperature threshold, such as 20 degrees Celsius on the exterior of the solidified build volume or some other temperature that allows for safe handling.

The cooling mechanism 108 represents a temperature-affecting device or a combination of a temperature-affecting device, circuitry, and executable instructions to cool a build volume when present in a housing within a second temperature range that is below the first temperature range. For example, the heating mechanism 106 may produce heat at a first temperature range 112 for a first time period 114 (such as a temperature and time period determined by the parameter engine) and the cooling mechanism 108 may reduce the temperature of a build volume to within a second temperature range using cooling fluid, where the second temperature range is below the first temperature range. Example cooling temperature ranges may depend on the build material and, for example, include below the material modification temperature (e.g. 165 degrees Celsius), around the glass transition temperature (e.g., 70 degrees Celsius), around a handling temperature (e.g., 20 degrees Celsius), or a temperature within those ranges. For example, the cooling mechanism 108 may cool the build volume (and/or the interior space of the housing) using a temperature range between 100 degrees Celsius to 60 degrees Celsius. The cooling temperature range difference from the post-print heating range may depend on the build material and may be a range that is below the material modification temperature of the build material. Example differences between the cooling temperature range and the post-print heating range may be 10 degrees Celsius below the heating range, 20 degrees Celsius below the heating range, 40 degrees Celsius below the heating range, 60 degrees Celsius below the heating range, 80 degrees Celsius below the heating range, 100 degrees Celsius below the heating range, 120 degrees below the heating range, and 150 degrees Celsius below the heating range. Cooling time periods may depend on the size of the build volume. Example cooling time periods for a build volume that is generated in eight hours may include six hours, four hours, two hours, sixty minutes, forty-five minutes, thirty minutes, twenty minutes, fifteen minutes, ten minutes, and five minutes.

Example cooling fluids include air, compressed air, water, liquid nitrogen, etc. The cooling fluid may have a higher conductive thermal property than the unsolidified build material (e.g., a higher conductivity than the unfused powder). The cooling mechanism 108 may actively cool or passively cool the cooling fluid. For example of a passive cooling mechanism, unsolidified powder may be physically separated from the solidified powder to change a boundary condition of the build volume by creating channels through the build volume to the solidified powder or otherwise exposing the solidified powder to fluid, such as air flow within the housing. As used herein, a boundary condition is a condition of the boundary of the build volume, such as the perimeter (e.g., outer layer) of the build volume exposed within the housing.

The cooling mechanism 108 may cool the exterior of the build volume at a particular rate compatible with a distortion threshold. For example, the cooling mechanism may cool at a rate below a distortion threshold, such as 0.5 degrees Celsius per minute. As used herein, a distortion threshold represents an amount of distortion of a 3D object, such as a percentage of shrinkage or degree of warpage. The cooling rate may be determined based on the time to print an object with a particular build material. For example, the cooling mechanism 108 may cool the build volume during the post-print stage in one half of the time used during the printing stage. For another example, the cooling mechanism 108 may cool the build volume during the post-print stage in one fifth of the time used during the printing stage. For yet another example, the cooling mechanism 108 may cool the build volume during the post-print stage in one tenth of the time used during the printing stage. For yet another example, the cooling mechanism 108 may cool the build volume during the post-print stage in one twentieth of the time used during the printing stage.

The temperature actively produced by the cooling mechanism 108 is below the material modification temperature of the build material. For example, the temperature of the cooling fluid used by the cooling mechanism 108 may be cooler than the temperature of the post-print environment within a housing during the post-print heating process. For another example, the air used by the cooling mechanism 108 may be air external to the post-print system 100, ambient air, or may be internal air that has been actively cooled (e.g., using an air conditioning method). In one example, the temperature of the cooling fluid used by the cooling mechanism 108 may be set by the post-print system 100 (e.g., via predetermined settings, print job settings, and/or input from the user). By enhancing the build material with heat for a time period, the build volume may, for example, be cooled at a faster rate than without the additional post-print heat transfer. This may be due to, for example, enhanced structural integrity that may withstand greater force from the cooling mechanism 108 without inducing part distortions, such as warpage. In that example, the improved resistance of the build volume allows for cooling at a temperature difference with, for example, a decreased likelihood of affecting the shape or strength of the build volume and may be cooled for a time period shorter than if the build volume was not heated during the post-print stage. For example, the cooling mechanism 108 may circulate cooling fluid, such as compressed air at a temperature cooler than the temperature applied by the heating mechanism 106, within the housing. In that example, the rate at which the cooling fluid circulates without distorting the build volume (that has been treated with post-print heating as describe herein) may be greater than the rate usable with a build volume that has not been treated with post-print heating, and, therefore, the time period for the cooling process may be less accordingly. In one example, a build volume may be cooled in ten minutes after six hours spent during the printing stage.

The post-print system 100 may, for example, be part of a print device, where the build volume remains in the same area used for the printing process, for the cleaning process, and for the cooling process. In another example, the post-print system 100 may be part of a post-print device that houses a post-print environment that is separate from the print device. In that example, a build volume may transported from the print device to a housing of the post-print device that is large enough to fit the build volume and establish a post-print environment within the housing as a space to heat, unpack, clean, recycle, and/or cool the build volume.

In some examples, functionalities described herein in relation to any of FIGS. 1, 2A, 2B, 3A, 3B, and 3C may be provided in combination with functionalities described herein in relation to any of FIGS. 4-7.

Figure 2A:
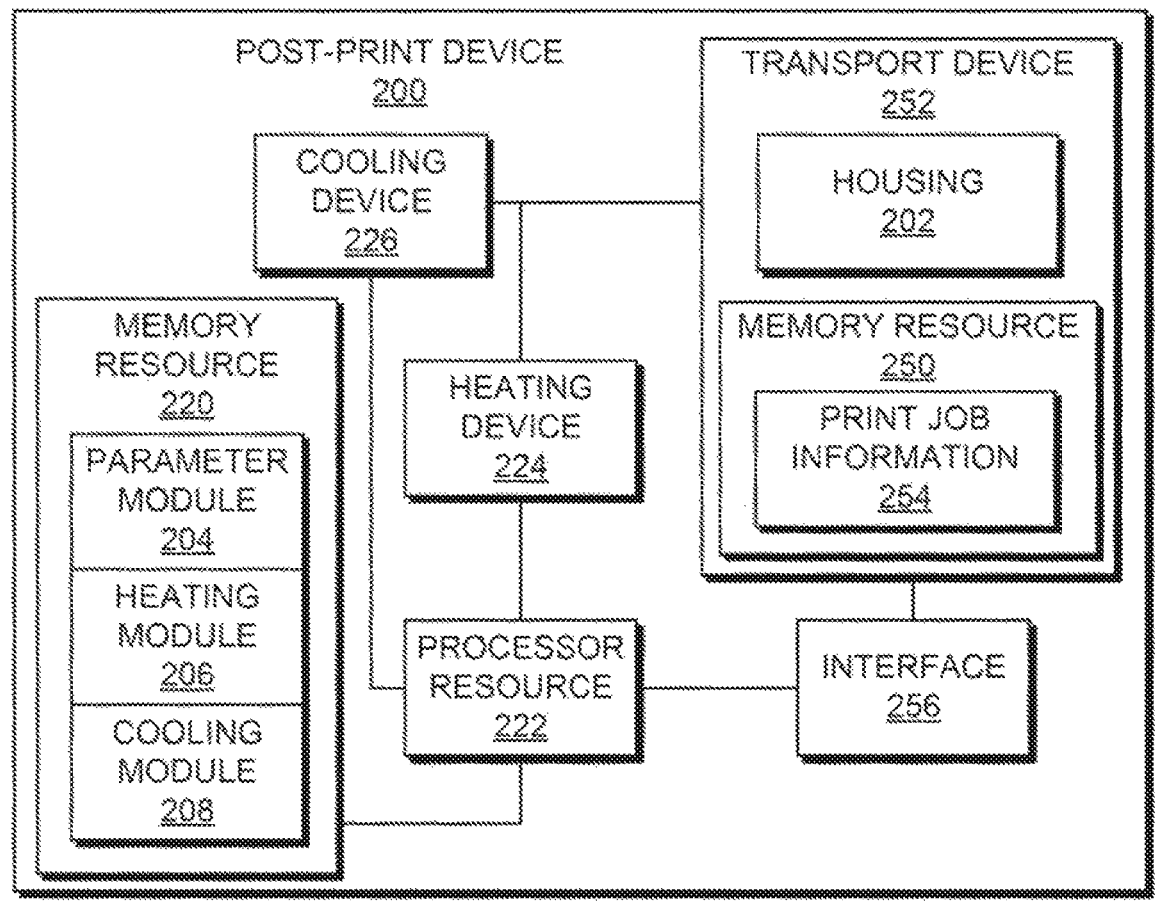
FIG. 2A is a block diagram depicting an example post-print device.

FIG. 2A depicts an example post-print device 200 comprising a transport device 252 coupled to a heating device 224 and a cooling device 228. FIG. 2A depicts that the post-print system 100 of FIG. 1 may be implemented using circuitry and executable instructions, such as a memory resource 220 operatively coupled to a processor resource 222. For example, the controller 104 of FIG. 1 is implemented using a combination of a processor resource 222 and instructions 204, 206, and/or 208, stored on the memory resource 220. The processor resource 222 may be operatively coupled to the heating device 224 and the cooling device 226 as well.

The transport device 252 is depicted in FIG. 2A as including a housing 202 and a memory resource 250. The transport device 252 is any appropriate device capable of holding a build volume produced by a print device that executes a print job. For example, the transport device 252 may include a cart that holds a build volume as the build volume is transported from a print device to a post-print device 200. As depicted in FIG. 2A, the memory resource 250 coupled to the transport device 252 contains print job information 254.

The transport device 252 may couple to the post-print device 200 via an interface 256. The print job information 254 is accessible by the post-print device 200 via the interface 256. For example, the processor resource 220 may execute the parameter module 204 to cause the processor resource 220 to, via the interface 256, retrieve the build material information from the print job information 254 located on the memory resource 250 coupled to the transport device 252. The interface 256 used to retrieve the print job information 254 may include a link that generally represents one or a combination of a cable, wireless connection, fiber optic connection, or remote connections via a telecommunications link, an infrared link, a radio frequency link, or any other connectors of systems that provide electronic communication. The link may include, at least in part, an intranet, the Internet, or a combination of both. The link may also include intermediate proxies, routers, switches, load balancers, and the like.

Referring to FIG. 2A, the memory resource 220 may contain a set of instructions that are executable by the processor resource 222. The set of instructions are operable to cause the processor resource 222 to perform operations of the device 200 when the set of instructions are executed by the processor resource 222. The set of instructions stored on the memory resource 220 may be represented as a parameter module 204, a heating module 206, and a cooling module 208. The parameter module 204, the heating module 206, and the cooling module 208 represent program instructions that when executed function (in conjunction with the processor resource 222, the heating device 224, and/or the cooling device 226) as controller 104, the heating mechanism 106, and the cooling mechanism 108 of FIG. 1 and/or as the controller 340, the heating mechanism 306, and the cooling mechanism 308 of FIG. 3C. For example, the processor resource 222 may execute a set of instructions to select a temperature and a time period based on build material information and maintain the solidified build material at the temperature for the time period in response to a determination that build layer is printed. The processor resource 222 may carry out a set of instructions to execute the modules 204, 206, 208, and/or any other appropriate operations among and/or associated with the modules of the device 200.

Figure 4:
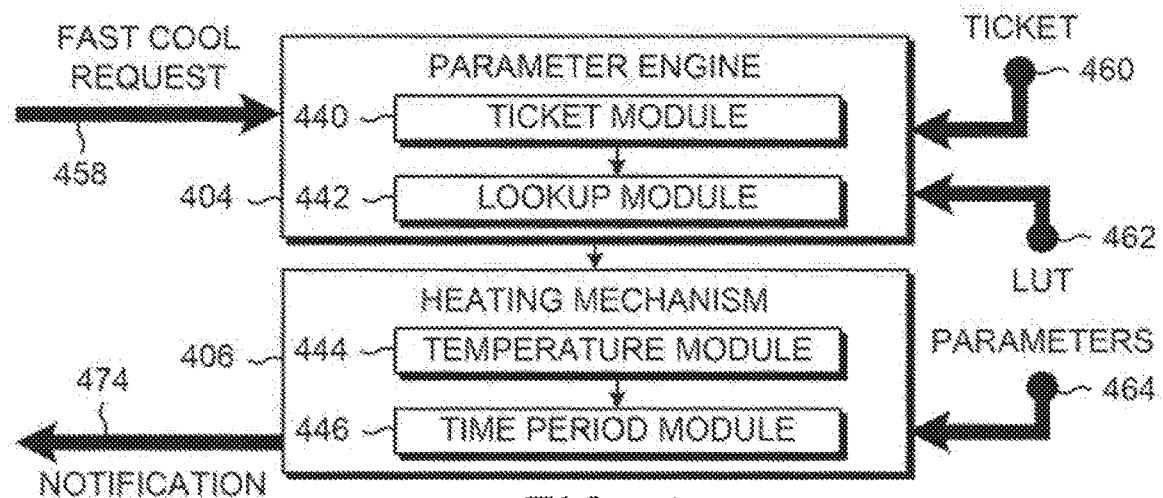
FIG. 4 depicts example components used to implement an example post-print system.

Although these particular modules and various other modules are illustrated and discussed in relation to FIG. 2A and other example implementations, other combinations or sub-combinations of modules may be included within other implementations. Said differently, although the modules illustrated in FIG. 2A and discussed in other example implementations perform specific functionalities in the examples discussed herein, these and other functionalities may be accomplished, implemented, or realized at different modules or at combinations of modules. For example, two or more modules illustrated and/or discussed as separate may be combined into a module that performs the functionalities discussed in relation to the two modules. As another example, functionalities performed at one module as discussed in relation to these examples may be performed at a different module or different modules. FIG. 4 depicts yet another example of how functionality may be organized into modules.

As used herein, a processor resource is any appropriate circuitry capable of processing (e.g., computing) instructions, such as one or multiple processing elements capable of retrieving instructions from a memory resource, such as memory resource 220, and executing those instructions. For example, the processor resource 222 may be a central processing unit (CPU) that enables cooling a build volume by fetching, decoding, and executing modules 204, 206, and 208. Example processor resources include at least one CPU, a semiconductor-based microprocessor, a programmable logic device (PLD), and the like. Example PLDs include an application specific integrated circuit (ASIC), a field-programmable gate array (FPGA), a programmable array logic (PAL), a complex programmable logic device (CPLD), and an erasable programmable logic device (EPLD). The processor resource 222 may include multiple processing elements that are integrated in a single device or distributed across devices. A processor resource may process the instructions serially, concurrently, or in partial concurrence.

As used herein, a memory resource represents a medium to store data utilized and/or produced by the post-print system, such as post-print device 200. The medium is any non-transitory medium or combination of non-transitory media able to electronically store data, such as modules of the device 200 and/or data used by the device 200. For example, the medium may be a storage medium, which is distinct from a transitory transmission medium, such as a signal. The medium may be machine-readable, such as computer-readable. The medium may be an electronic, magnetic, optical, or other physical storage device that is capable of containing (i.e., storing) executable instructions. A memory resource may be said to store program instructions that when executed by a processor resource, such as processor resource 222, cause the processor resource to implement functionality of the post-print system, such as device 200 of FIG. 2A. A memory resource may be integrated in the same device as a processor resource or it may be separate but accessible to that device and the processor resource. A memory resource may be distributed across devices. The data of the memory resource, such as the data stored on memory resources 220 and 250, may include representations of data and/or information mentioned herein, such as print job information 254, a lookup table, and/or parameters determined by executing the parameter module 204.

In the discussion herein, the system components of FIG. 1 and the device components of FIG. 2A have been described as circuitry or a combination of circuitry and executable instructions. Such components may be implemented in a number of fashions. Looking at FIG. 2A, the executable instructions may be processor-executable instructions, such as program instructions, stored on the memory resource 220, which is a tangible, non-transitory computer-readable storage medium, and the circuitry may be electronic circuitry, such as processor resource 222, for executing those instructions. The instructions residing on the memory resource 220 may comprise any set of suitable instructions to be executed directly (such as machine code) or indirectly (such as a script) by the processor resource 222.

In some examples, the system 200 may include the executable instructions as part of an installation package that when installed may be executed by the processor resource 222 to perform operations of the system 200, such as methods described with regards to FIGS. 4-7. In that example, the memory resource 220 may be a portable medium such as a compact disc, a digital video disc, a flash drive, or memory maintained by a compute device, such as a cloud server, from which the installation package may be downloaded and installed. In another example, the executable instructions may be part of an application or applications already installed. For yet another example, the engines, modules, and/or data discussed herein may reside and/or execute "on the cloud" (e.g., reside and/or execute on a virtual shared pool of resources). The memory resource 220 may be a non-volatile memory resource such as read only memory (ROM), a volatile memory resource such as random access memory (RAM), a storage device, or a combination thereof. Example forms of a memory resource include static RAM (SRAM), dynamic RAM (DRAM), electrically erasable programmable ROM (EEPROM), flash memory, or the like. A memory resource may include integrated memory such as a hard drive (HD), a solid state drive (SSD), or an optical drive.

Figure 2B:
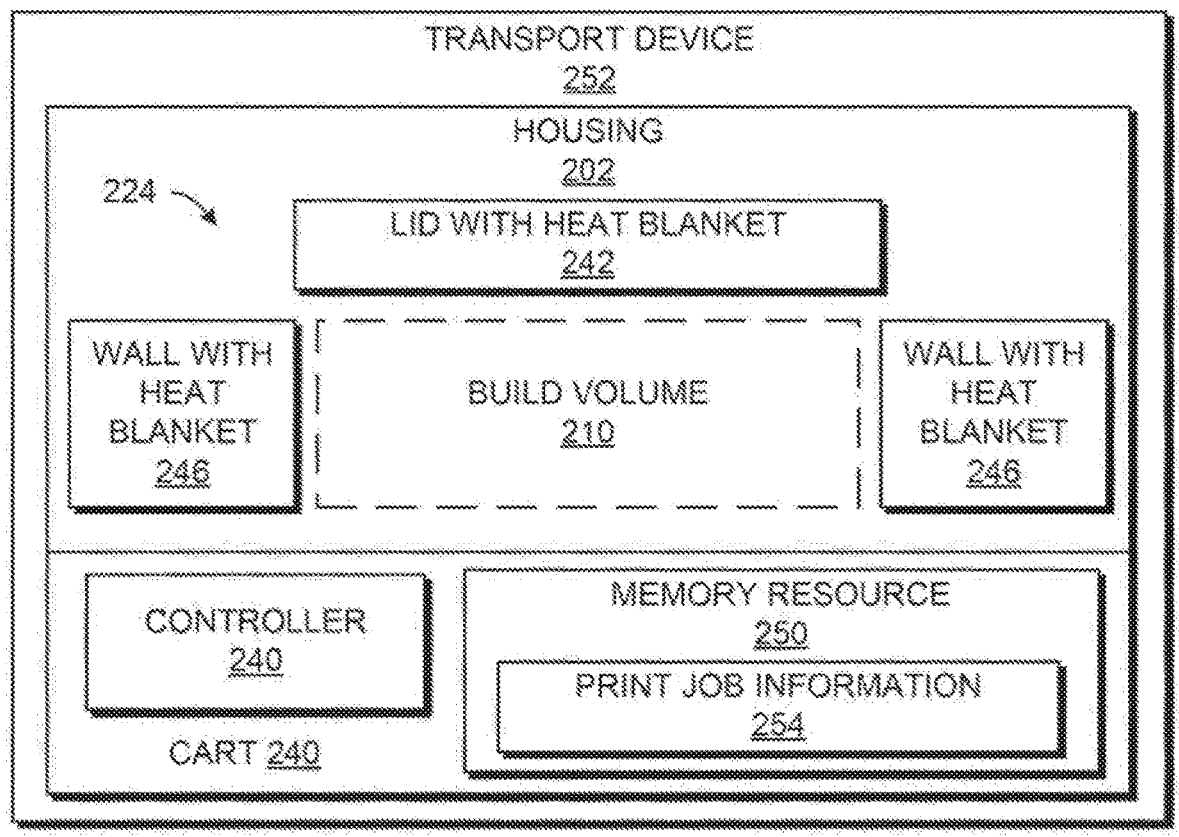
FIGS. 2B and 3A are block diagrams depicting example housings.

FIGS. 2B and 3A are block diagrams depicting example housings 202 and 302. Referring to FIG. 2B, an example housing 202 is part of a transport device 252. The transport device 252 is a device for transporting a build volume. In the example of FIG. 2B, the transport device 252 may comprise a housing 202 (where a build volume 210 is contained) and a portion used as a cart 240 to move the build volume 210 around and/or facilitate the post-print process. For example, the cart 240 may contain a controller 240 and a memory resource 250 with print job information 254 as discussed with regards to FIG. 2A. The controller 240 represents the same component as the controller 104, which may be integrated into a system or device (such as a transport device, a print device or a post-print device) or distributed across devices. As shown in FIG. 2B, the housing 202 may include a heating device 226 comprising a plurality of components. In the example of FIG. 2B, the heating device 226 is composed of heat blankets attached to structure elements of the housing 202. For example, the transport device 252 may comprise a bucket-like housing structure including side walls 246 and a lid 242 where the side walls 246 and the lid 242 are lined with heat blankets on the exterior surfaces of the side walls 246 and the lid 242 (where the heat blankets may heat up the metal walls to heat the interior of the housing 202 in order to heat the build volume 210). Alternatively or in addition, the heat blankets may be inside or otherwise part of the side walls 246. Using heat blankets adjacent to the housing walls as the heating device 226, the interior of the bucket (where the build volume 210 would be located) may be maintained at a temperature within a temperature range based on a material modification temperature as discussed further herein. The term "maintain" (and variations thereof) as used herein means "to keep at a state that satisfies a particular condition." For example, a temperature state may be maintained by providing heat within a temperature range that satisfies a threshold temperature defined by the condition for the state, where "heat at a threshold temperature" includes a temperature range that heats at or above a threshold temperature (e.g., a material modification temperature). Example temperature ranges include at or above a crystallization point of a build material to a fusing point or melting point of the build material and, for metals, within a thermal processing range that appropriately affects or avoids grain ripening.

Referring to FIG. 3A, a housing 302 may be an integrated component of a 3D print device 300. In the example of FIG. 3A, the housing 302 includes a heat mechanism 306 comprising a plurality of components. For example, the side walls of the housing 330 may be lined with heat blankets 346 and a heat lamp 348 may be located at the top of the housing 302, such as on a device that prints the build material from a material cartridge to produce the build volume 310. In that example, the heat lamp 348 may provide heat during the print stage as well as the post-print stage by focusing the heat on the last layers of the build volume in order to maintain the layers at a temperature, for example, above the crystallization point of the build material for an identified amount of time as discussed further herein. In that example, the last layers printed are least likely to be heated for the structural enhancement duration because the environment may generally be kept above the material modification temperature due to the print processes.

FIGS. 3B and 3C depict example 3D print devices 300 comprising a housing 302, a print engine 336, a controller 340, and a heating mechanism 306. Referring to FIG. 3B, the 3D print device may also include a parameter engine 304 and a cooling mechanism 308. The descriptions of the controller 104, the heating mechanism 106, and the cooling mechanism 108 of FIG. 1 are applicable to the controller 340, the heating mechanism 306, and the cooling mechanism 308, and, for brevity, the descriptions are not repeated in their entirety. The controller 340 may comprise a parameter engine 304 and may utilize data, such as the crystallization point 312, to control the heating mechanism 306 and/or cooling mechanism 308. Parameter engine 304 represents circuitry or a combination of circuitry and executable instructions (such as processor resource 222 and parameter module 204 of FIG. 2) to identify build material information of a print job. For example, the parameter engine 304 may identify temperature setting for the heating mechanism that is above a crystallization point 312 that is associated with the build material information.

The print engine 336 is any circuitry or combination of circuitry and executable instructions to produce a build volume 310 from print job information executed by circuitry of the print engine 336. As described herein, a build volume, such as build volume 310, may comprise powder 334 (e.g., unsolidified build material) and a 3D object 332 (e.g., solidified build material) made of the build material. In one example, the build volume may be directly generated in a transport device, such as transport device 252 of FIG. 2A.

The print device 300 may operate the engines and mechanisms herein via the controller in response to activation of a fast print mode. For example, the controller 340, in response to a determination of a fast print mode for the print job, identifies the build material of the print job information and determines a temperature and a time period based on build material information representing the desired build material. In response to a determination that a build layer is printed during fast print mode, the controller 340 causes the heating mechanism 306 to maintain the build volume (and/or the interior space of the housing 302) within the determined temperature range (e.g., at the temperature of the lockup table) in order to heat the build layer for the determined time period (e.g., the time period associated with the build material and the temperature as identified by the structural enhancement duration). In response to a determination that the time period has completed for layers of the build volume (such as when the last-printed layer has been heated for the identified time period), the controller 340 causes the cooling mechanism 308 to actively cool the build layers, such as by circulating air within the housing 302 and/or passing external air at a lower ambient temperature into the housing 302, which may have ambient air at a higher temperature.

FIG. 4 depicts example components used to implement an example post-print system. Referring to FIG. 4, the example components of FIG. 4 generally include a parameter engine 404 and a heating mechanism 406 that represent similar components to the parameter engine 304 and the heating mechanism 306 of FIG. 3. The example modules of FIG. 4 may be implemented on a compute device, such as client computer, a cloud server, a print device, or a post-print device.

A fast cool request 458 is received by a controller comprising the parameter engine 404. The parameter engine 404 may execute program code, such as ticket module 440 and lookup module 442, to assist retrieval of print job information and identification of parameters 464 for the heating mechanism 406. The ticket module 440 represents program instructions that when executed by circuitry, such as a processor resource, cause the parameter engine 404 to retrieve the ticket 460 (i.e., a data structure) that contains print job information associated with the print job selected for fast cool print mode (e.g., a print job with which a fast cool request is made). The build material information is extracted from the ticket 406 by the parameter engine 404. The lookup module 442 represents program instructions, that when executed, cause the parameter engine 404 to perform a lookup in a lookup table (LUT) 462 to identify parameters 464 for heating the build volume. Parameters 464 comprise a temperature and a time period.

The heating mechanism 406 may comprise program instructions, such as temperature module 444 and time period module 446, to facilitate setting the heating mechanism 406 to maintain the build volume (and/or the interior space of the housing) based on the parameters 464. The temperature module 444 represents program instructions that when executed by circuitry of the heating mechanism 406, such as a processor resource, cause the heating mechanism to set to a temperature based on the parameters 464 retrieved from the LUT 462. The time period module 446 represents program instructions that when executed by circuitry of the heating mechanism 406, sets the duration of providing heat by the heating mechanism 406 based on the parameters 464. A notification 474 may be sent to a user or application making the fast cool request 458. As examples, a notification 474 may comprise a message that the post-print device has been set to fast cool for a particular time period, a countdown message may appear on the post-print device, a message that the post-print heating is complete may appear on the control panel of the post-print device, or a message may appear when the active cooling process is performed or completed performance once the post-print heating process is completed by the heating mechanism 406.

Figure 5:
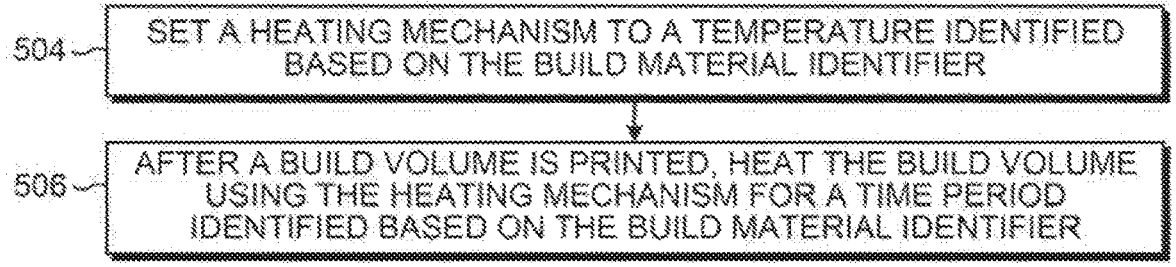
FIGS. 5-7 are flow diagrams depicting example methods for cooling a build volume produced by a three-dimensional print device.
Figure 6:
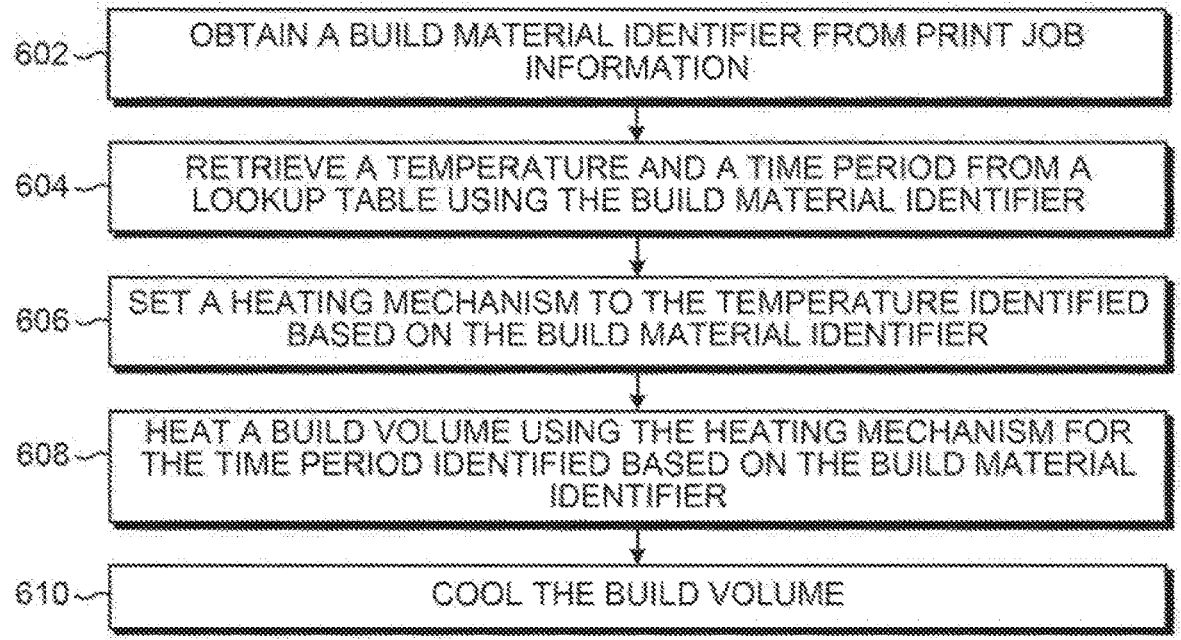
Figure 7:
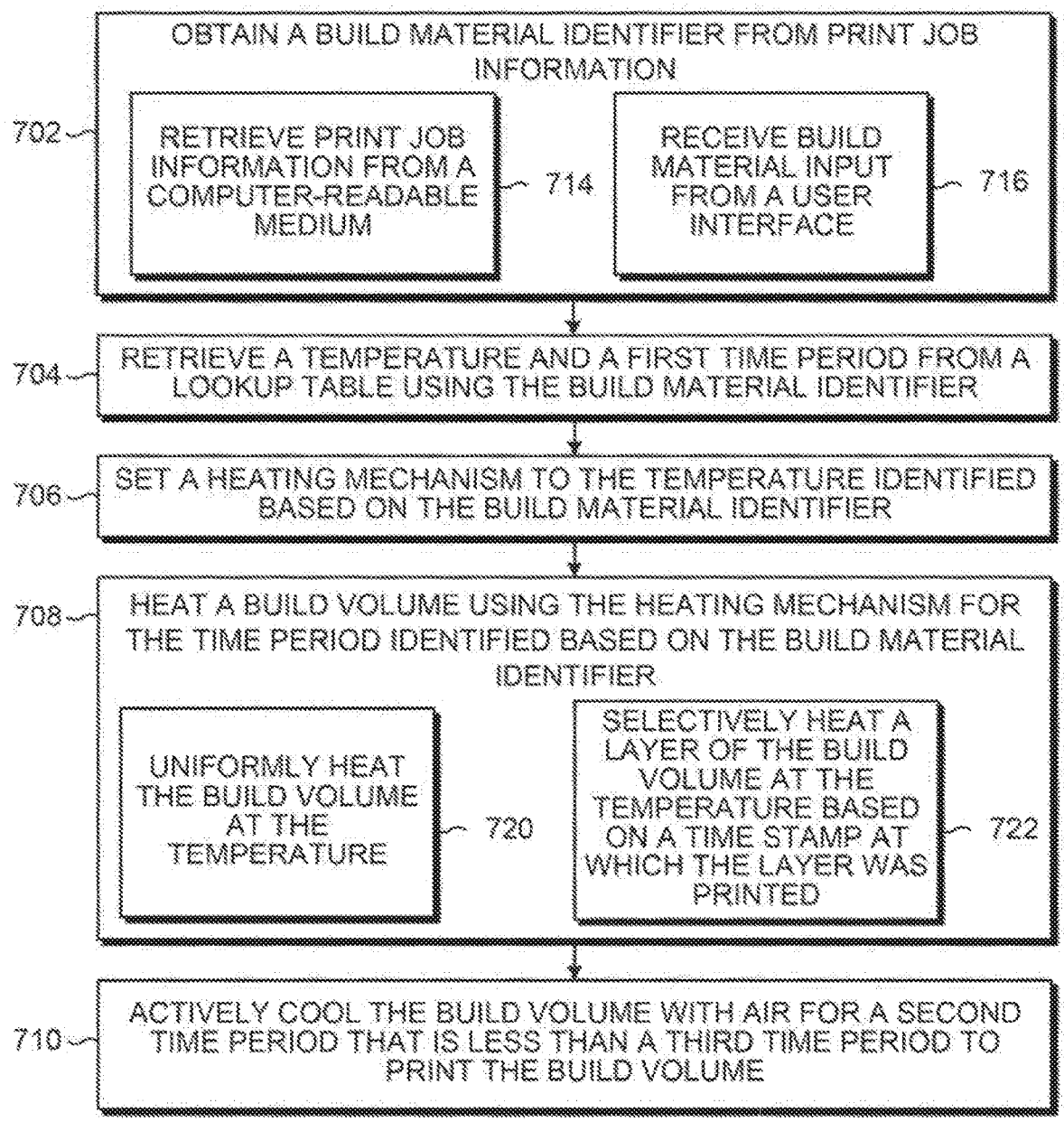

FIGS. 5-7 are flow diagrams depicting example methods for cooling a build volume produced by a three-dimensional print device. Referring to FIG. 5, example methods for cooling a build volume may generally comprise setting a heating mechanism to a temperature identified based on the build material identifier and heating the post-print environment using the heating mechanism for a time period identified based on the build material identifier. The example methods of FIGS. 5-7 are performable by post-print systems, post-print devices, and print devices with post-print components as described herein.

At block 504, a heating mechanism, such as heating mechanism 106 of FIG. 1, is set to a temperature identified based on the build material identifier obtained at block 502. As described herein, the temperature is to be above the material modification temperature (e.g., the crystallization point) of the build material represented by the build material identifier.

At block 506, the build volume is heated using the heating mechanism for a time period based on the build material identifier. The build volume is heated after the build volume is printed during a post-print stage for a time period, such as a structural enhancement duration that achieves a structural consistency threshold of the build volume. Heating the post-print environment may include using a heating mechanism (such as heating mechanism of FIG. 1) to directly heat the build material of the build volume or indirectly heat the build material of the build volume. For example, the interior space of the housing (and all the layers of the build volume) may be uniformly heated at a temperature high enough that the 3D object within the build volume is able to achieve a temperature at or above the crystallization point of the build material of the build volume. The range of temperatures to heat the build volume after printing may be between the material modification temperature and the fusion or melting point of the build material. For an example thermoplastic, the crystallization point is at 140 degrees Celsius and the fusion point is at 180 degrees Celsius and the temperature selected is (at or above) 165 degrees Celsius for (at least) 60 minutes. Other example ranges have been mentioned herein. After the time period expires, the build volume may become, for example, enhanced to withstand active cooling. For example, the time period may be set (e.g., predetermined or calculated) to achieve a threshold duration (i.e., a structural enhancement duration) of heating at the associated temperature that may, for example, increase crystal size of the build material.

FIG. 6 includes blocks similar to blocks of FIG. 5 and provides additional blocks and details. In particular, FIG. 6 depicts additional blocks and details generally regarding obtaining the build material identifier, retrieving the temperature and the time period and actively cooling the build volume. Blocks 606 and 608 are the same as blocks 504 and 506 of FIG. 5 and, for brevity, their respective descriptions are not repeated in their entirety.

At block 602, a build material identifier is obtained from print job information. For example, a parameter engine, such as parameter engine 102, may parse print job information to identify a build material identifier representing a build material used to produce the build volume located within the housing. The build material associated with the build material identifier may be verified among the print job information and the components of the post-print system to ensure a matching among the build material of the build volume, the print job information, and the settings of the heating mechanism. A sufficient match may be identified to confirm that the build material of the build volume is sufficiently affected by the settings used during the post-print heating stage, for example, when the build material of the build volume is not the exact material represented by the build material identifier. For example, the build material identifier of the print job information may be compared to build material information of a cartridge coupled to the printer device, and if the class of material is the same, then the post-print heating stage may continue.

At block 604, the temperature and the time period are retrieved from a lookup table using the build material identifier. For example, in response to a selection of fast print mode, a first value representing the build material may be used as a key to identify a second and third values of fields in a lookup table that represent a temperature and a time period associated with the build material. For another example, a value such as "PLA01" representing a particular plastic may be used as a key to identify a temperature field value (e.g., 165 degrees Celsius) and a time period field value (e.g., 45 minutes). In that example, a heating mechanism, such as heating mechanism 106 of FIG. 1, may be set to the temperature field value of 165 degrees Celsius at block 606 and heat the build volume (and the interior space of the housing) at 165 degrees Celsius for at least the length of time of the time period field value of 45 minutes at block 608. The temperature field value may be a single temperature or a range of temperatures. For example, the temperature range size associated with a build material may be as small as a single degree.

At block 610, the build volume is cooled. The build volume may be actively cooled, such as by circulating fluid within a housing. The fluid used by a cooling mechanism, such as cooling mechanism 106, may have fluid properties relative to the structural consistency level. For example, the cooling mechanism may cool the build volume at a rate acceptable by the structural consistency level without exceeding a rate, amount, or likelihood of distortion. For another example, the build volume may be heated to achieve a structural consistency level that allows for the cooling mechanism to use fluid at a cooler temperature than before the post-print heating process. The structural consistency level may be related to mechanical properties of the build volume, such as the tensile strength of the build material for example, the tensile strength of the build volume may be measured to identify whether a structural consistency level (e.g., a level of tensile strength) is achieved. The structural consistency level may be related to shrinkage. For example, the percentage of change in the size of a part may be measured and compared to a threshold level of shrinkage (e.g., a structural consistency level). The structural consistency level may be related to deformations. For example, a part of the build volume that is thinner than other parts may be more likely to warp due to tensions being released during the cooling process and the amount of warp may compared to an expected surface contour (e.g., flatness) of the part to verify whether the warpage is within an appropriate tolerance level (e.g., a structural consistency level). In an example, the fluid used to cool the post-print environment may be the same fluid used to remove excess powder from the build volume. The time to cool the build volume may be, for example, less than the time period used to the print the build volume. For example, it may take minutes to cool the build volume after printing the job for hours.

FIG. 7 includes blocks similar to blocks of FIGS. 5 and 6 and provides additional blocks and details. In particular, FIG. 7 depicts additional blocks and details generally regarding retrieving the print job information and uniformly or selectively heating the build volume when within the housing. Blocks 702, 704, 706, 708, and 710 are similar to blocks 602, 604, 606, 608, and 610 of FIG. 6 and, for brevity, their respective descriptions are not repeated in their entirety.

At block 702, the build material identifier may be obtained by at least one of retrieving print job information from a computer-readable medium at block 714 or receiving a build material input from a user interface at block 716. For example, the user may select the type of build material used to produce the build volume as the build material input and the post-print device may select a temperature and time period associated with the build material input at 706 and heat the build volume and the interior space of the housing at those settings at block 708. At block 714, the computer-readable medium, as discussed herein, may be coupled to transport device or coupled to a compute device and print job information may be retrieved by a parameter engine, such as a parameter engine 304 of FIG. 3C, from the computer-readable medium via an interface.

At block 708, the interior space of the housing where the build volume is located may be heated uniformly at block 720 or selectively at block 722. For example, the housing structure surrounding the build volume may be heated at a determined temperature by a heating mechanism, such as the heating mechanism 106 of FIG. 1. Alternatively or in addition, at block 722, a layer of the build may be selectively heated at the determined temperature based on a time stamp at which the layer was printed. For example, the post-print device may track the current time, make a comparison to the time stamp at which the build layer was printed, and continue to heat the layer until the identified time period is achieved. Thus, when a build volume completes, the heating mechanism may focus on heating the most recently printed layers that may not have had a threshold amount of time of post-print heating (e.g., have not achieved the structural enhancement duration). By heating those layers that may otherwise not have had post-print time to heat, part distortions may, for example, be avoided, and execution of the print job and post-print stages may result in achieving a desired accuracy in the printed output. In this manner, the build volume may, for example, achieve a first structural consistency level that is beyond a second structural consistency level of the build material during the print stage, wherein the first structural level is able to withstand a first rate of cooling that is greater than a second rate of cooling associated with a distortion threshold that represents an integrity limit of the second structural consistency level of the build material. In other words, by additionally heating the build material, the structural consistency of the build material is elevated above the previous integrity limit possible by natural cooling process, and may, for example, allow the build volume to be cooled at a faster rate than letting the build volume sit.

Although the flow diagrams of FIGS. 4-7 illustrate specific orders of execution, the order of execution may differ from that which is illustrated. For example, the order of execution of the blocks may be scrambled relative to the order shown. Also, in some examples at least some of the blocks shown in succession may be executed concurrently or with partial concurrence. All such variations are within the scope of the present description.

All of the features disclosed in this specification (including any accompanying claims, abstract and drawings), and/or all of the elements of any method or process so disclosed, may be combined in any combination, except combinations where at least some of such features and/or elements are mutually exclusive.

The present description has been shown and described with reference to the foregoing examples. It is understood, however, that other forms, details, and examples may be made without departing from the spirit and scope of the following claims. The use of the words "first," "second," or related terms in the claims are not used to limit the claim elements to an order or location, but are merely used to distinguish separate claim elements.

What is claimed is:

1. A post-print system comprising: a heating mechanism to heat a build volume when present in a housing within a first temperature range for a time period during a post-print stage; a cooling mechanism to cool the build volume when present in the housing within a second temperature range that is below the first temperature range; and a controller programmed to control the heating mechanism and the cooling mechanism based on build material information associated with the build volume.

2. The system of claim 1, wherein the controller comprises a parameter engine to identify build material information of a print job to produce a three dimensional object, wherein:
   the parameter engine identifies the first temperature range and the time period from a table or a thermal model, the first temperature range based on a material modification temperature of a build material of a build volume;
   the build material information represents a build material; and
   the time period has an inverse relationship with the first temperature range, the time period to satisfy a structural enhancement duration.

3. The system of claim 2, wherein the parameter engine is to retrieve the build material information from at least one of:
   a directly connected compute device;
   a remote storage location; or
   a computer-readable medium coupled to a transport device that includes the housing and is able to hold the build volume.

4. The system of claim 1, wherein the heating mechanism heats a subset of build layers of the build volume.

5. The system of claim 1, wherein the heating mechanism uniformly heats the build volume by applying heat to all layers of the build volume within the housing using heating blankets adjacent to the housing.

6. The system of claim 1, wherein the cooling mechanism uses a fluid and the cooling mechanism circulates the fluid within the housing when the housing contains the build volume.

7. The system of claim 1, wherein the build material information is predetermined and the heating mechanism comprises at least one of:
   a heat lamp;
   a resistor-based heat element around an exterior surface of the housing or inside a wall of the housing; or
   an insulator to maintain the build volume at a first temperature about at which the build volume was printed, wherein the insulator covers a surface of the housing.

8. The system of claim 1, wherein the build volume achieves a first structural consistency level that is beyond a second structural consistency level of the build material during the print stage, wherein the first structural level is able to withstand a first rate of cooling that is greater than a second rate of cooling associated with a distortion threshold that represents an integrity limit of the second structural consistency level of the build material.

9. The system of claim 1, wherein the controller is programmed to operate the heating mechanism during the post-print stage to heat the build volume above a crystallization temperature of the build material of the build volume.

10. The system of claim 9, wherein the controller is programmed to operate the heating mechanism in the post-print stage to increase structural integrity of an object being formed in the build volume.

11. The system of claim 10, further comprising a cooling mechanism, wherein the controller is further programmed to operate the cooling mechanism to cool the build volume after the heating mechanism has increased the structural integrity of the object.

12. The system of claim 1, wherein:
the post-print system is separate from a print device; and
the post-print system comprises a transport device for moving the housing from the print device into engagement with the heating and cooling mechanisms of the post-print system.

13. The system of claim 1, wherein the heating mechanism comprises a heat blanket on the housing.

14. A print device comprising: a print engine to produce a build volume within a housing, the build volume including solidified build material and unsolidified build material; and a controller programmed to: select a temperature and a time period based on build material information, the build material information representing the solidified build material; and, in response to a determination that a build layer is printed, cause a heating mechanism to maintain the solidified build material at the temperature for the time period, the temperature to be above a crystallization point of the solidified build material.

15. The device of claim 14, wherein the heating mechanism is used to heat the build volume in a printing stage and in a post-print stage.

16. The device of claim 14, wherein:
the heating mechanism identifies, in response to a determination of a fast print mode, the build material information by retrieving build material information from an electronic file that represents the print job; and
the heating mechanism determines the temperature and the time period by looking up the build material information in a lookup table.

17. A post-print device comprising:
a heating mechanism to heat a build volume when present in a housing within a first temperature range for a time period during a post-print stage;
a cooling mechanism to cool the build volume when present in the housing within a second temperature range that is below the first temperature range; and
a controller to control the heating mechanism and the cooling mechanism based on build material information associated with the build volume;
wherein the controller is further programmed to perform:
setting the heating mechanism to a temperature identified based on a build material identifier, the temperature being above a crystallization point of a build material represented by the build material identifier; and
after the build volume is printed, heating the build volume using the heating mechanism for a time period identified based on the build material identifier, wherein the time period represents a structural enhancement duration at the temperature that achieves a structural consistency level of the build volume.

18. The device of claim 17, wherein the controller is further to perform:
obtaining the build material identifier from print job information;
retrieving the temperature and the time period from a lookup table using the build material identifier; and
actively cooling the build volume with a fluid having fluid properties relative to the structural consistency level.

19. The device of claim 17, wherein obtaining the build material identifier from the print job comprises at least one of:
retrieving print job information from a computer-readable medium; and
receiving a build material input from a user interface.

20. The device of claim 17, wherein heating the build volume comprises:
uniformly heating the build volume at the temperature; and
selectively heating a layer of the build volume at the temperature based on a time stamp at which the layer was printed.

* * * * *